United States Patent [19]

Blum

[11] Patent Number: 4,647,726

[45] Date of Patent: Mar. 3, 1987

[54] TELEPHONE SECURITY CLAMP

[76] Inventor: Richard S. Blum, 25 Spruce Dr., East Hills, N.Y. 11576

[21] Appl. No.: 752,136

[22] Filed: Jul. 5, 1985

[51] Int. Cl.[4] .................. H04M 1/66; H01R 13/62

[52] U.S. Cl. .................. 379/438; 379/178; 379/189 R; 379/445; 24/115 A; 24/136 R; 339/75 R

[58] Field of Search .......... 179/184, 178, 179, 189 R; 339/76, 77, 78, 79, 82

[56] References Cited

U.S. PATENT DOCUMENTS 4,311,883 1/1982 Kidney .................. 179/189 R 4,579,410 4/1986 Soloman .................. 339/82

*Primary Examiner*—Gene Z. Rubinson

*Assistant Examiner*—Danita R. Byrd

*Attorney, Agent, or Firm*—Helfgott & Karas

[57] ABSTRACT

A telephone security clamp for preventing removal of modular telephone equipment which is electrically connected by its modular jack to a modular socket. The security clamp includes a wedge which is inserted beneath the release tang of the modular jack. The tang is thereby blocked and prevented from being depressed to thereby prevent removal of the jack from the socket. A housing clamps the wire directly adjacent the wedge and thereby prevents access to the wedge. The wedge and housing can be integrally formed of unitary construction.

12 Claims, 7 Drawing Figures

TELEPHONE SECURITY CLAMP

BACKGROUND OF THE INVENTION

This invention relates to telephone security means, and more particularly to a telephone security clamp for preventing the unauthorized removal of modular telephone equipment.

The use of modular telephone equipment is becoming more prevalent throughout the telephone industry. In using modular equipment, each of the various parts of the telephone apparatus are interconnected to other parts by means of modular telephone jacks which are received in modular sockets. Typically, such modular jacks are standardized whereby alternate telephone equipment can be easily installed into the same modular jacks.

The typical modular jack includes an upwardly projecting tang which locks in a shoulder provided within the socket. The modular jack can be extracted by depressing the tang thereby releasing the jack for removal from the socket. Typically, the removal of the modular telephone jack from a socket is easily accomplished without the need of any equipment and is done in a matter of seconds without hesitation.

While the use of telephone jacks has facilitated the ability of consumers to change telephone equipment by themselves, it has also created a problem concerning the unauthorized removal and pilferage of modular telephone equipment. Since the equipment is so easily removed by simply extracting the modular telephone jack from its socket, an unauthorized individual can easily go over to any type of telephone equipment, release the jack from its socket, and remove the telephone equipment.

Such easy removal of telephone equipment has caused a problem for large institutions where telephones are frequently left unattended without proper protection. These telephones may be in unattended offices, on desks, in lounge areas, or other frequently accessed parts of the institution which cannot always be readily guarded. Unauthorized individuals can remove handsets, instruments, entire telephones, and often more sophisticated equipment which is also connected by means of the standard telephone jack into the telephone socket.

U.S. Pat. No. 4,311,883 describes a lock arrangement for securing the modular telephone instrument. In this patent, there is provided a housing that clamps onto the wire and includes a dummy telephone jack. The actual telephone modular jack is extracted from the socket and the dummy jack on the lock is inserted in its place in the socket. The dummy jack includes a releasable tang which is protectively secured within the lock so that it is unaccessable. In this manner, the lock is secured into the modular socket.

While such a device may be useful in preventing the removal of the unauthorized equipment, at the same time it requires that the telephone instrument be disconnected from the telephone circuitry. The actual telephone jack must be extracted and the dummy jack inserted. Accordingly, while the instrument is maintained secure, the instrument itself becomes useless to authorized personnel. Authorized personnel must therefore open the lock, remove the telephone wire, reinsert the actual telephone jack and only then be able to utilize the instrument. The lock therefore mutually excludes the ability to utilize the instrument, while the instrument is being protected.

Accordingly, there is a need for a security device which will prevent unauthorized removal of the telephone instrument and, at the same time, will not disengage the instrument itself from use by authorized personnel.

SUMMARY OF THE INVENTION

Accordingly, it is an object of the present invention to provide a telephone security clamp which avoids the aforementioned problems of prior art devices.

Another object of the present invention is to provide a telephone security clamp which prevents removal of modular telephone equipment by unauthorized individuals.

Yet another object of the present invention is to provide a telephone security clamp preventing removal of modular telephone equipment while the equipment is electrically connected by its modular jack to the modular socket of the telephone circuit.

A further object of the present invention is to provide a telephone security clamp preventing removal of modular telephone equipment, which permits the telephone equipment to be maintained in electrical connection with its telephone circuitry while the security clamp is engaged.

Another object of the present invention is to provide a method of unauthorized removal of the modular telephone equipment where the equipment is still connected by its modular jack to the modular socket of the telephone electrical circuitry.

A further object of the present invention is to provide a telephone security clamp which is easy to manufacture, simple to utilize and effective in carrying out its intended purpose.

Briefly, the present invention provides for a telephone security clamp for preventing removal of modular telephone equipment which is still electrically connected by its modular jack to modular sockets of the telephone circuitry. The security clamp includes a wedge which is inserted beneath the release tang of the modular jack thereby blocking the depression of the release tang. In this manner, the modular jack cannot be removed from its socket. Clamping means are provided preventing extraction of the wedge from beneath the tang.

In an embodiment of the invention, the clamping means includes a housing which clamps onto the telephone wire directly adjacent to the telephone jack and by means of a one time closure device locks the housing onto the wire. Once closed, the wedge cannot be accessed and thereby cannot be extracted.

The only way to remove the telephone jack would be to destroy the security clamp by means of severing its parts so as to open up the clamp thereby releasing the wire and disengaging the wedge from the standard modular jack.

The aforementioned objects, features and advantages of the invention will, in part, be pointed out with particularity, and will, in part, become obvious from the following more detailed description of the invention, taken in conjunction with the accompanying drawings, which form an integral part thereof.

BRIEF DESCRIPTION OF THE DRAWINGS

In the drawings.

In the various figures of the drawing, like reference characters designate like parts.

DESCRIPTION OF THE PREFERRED EMBODIMENT

Figure 1:
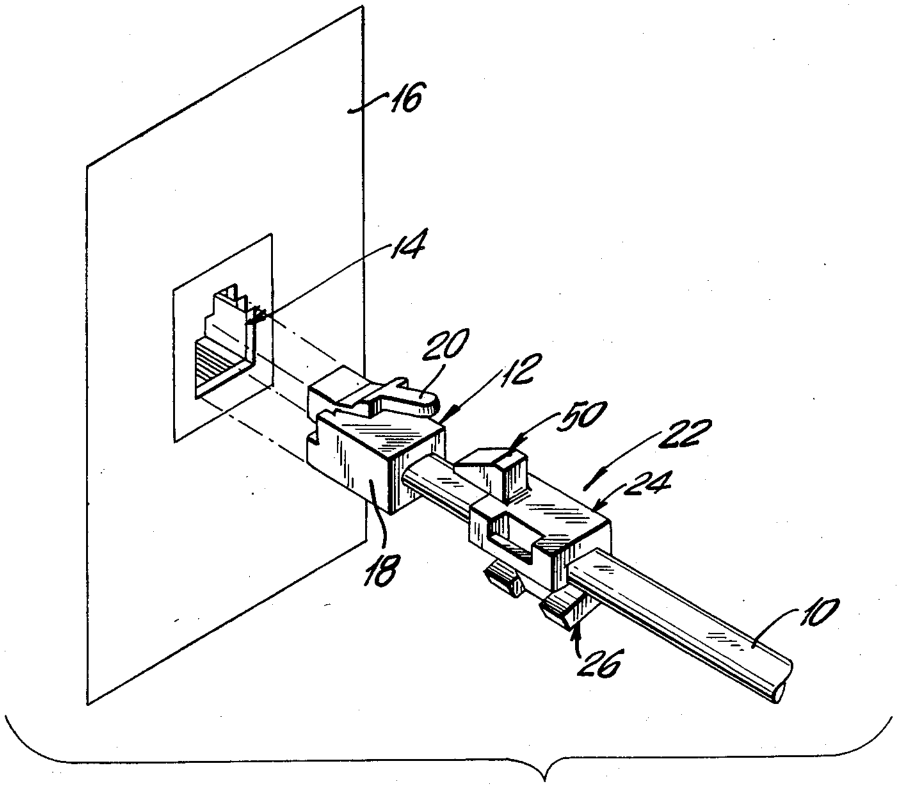
FIG. 1 is an exploded perspective view of the telephone security clamp in position for clamping onto the wire and wedging beneath the modular telephone jack which would be inserted in the modular socket.

Referring now to FIG. 1, there is shown a telephone wire 10 to which is connected a standard telephone jack 12 which would be inserted in a modular socket 14 associated with telephone circuitry. The modular socket 14 is placed on a socket plate 16 which would be mounted onto a wall or some other area. It should be understood, that similar telephone sockets are provided on the telephone apparatus itself. For example, in connecting a telephone handset onto a telephone base instrument a similar arrangement of a modular jack would be inserted into a modular socket.

The modular telephone jack 12 includes a substantially rectangular housing 18 with an upwardly projecting, rearwardly directed tang portion 20. The tang portion 20 would be inserted in the socket and would catch onto a shoulder portion in the socket to retain the telephone jack in place.

The telephone security clamp of the present invention is shown generally at 22. With reference now to FIGS. 1–6, the telephone security clamp includes a first housing member 24 and a second housing member 26. The first housing member 24 is substantially rectangular and includes a transverse channel 28 extending entirely thereacross for receiving passage therethrough of the telephone wire. A recess trough 30 is depressed beneath the channel portion 28. A vertical passageway 32 extends through the first housing member adjacent its distal edge and includes a forward projecting cut out portion 34 defining a shoulder portion 36 thereabove.

The second housing member 26 includes a downwardly projecting boss 38 which can be received in the depressed trough 30 so as to define therewith a strain relief mechanism. A latch 40 is slightly inwardly recessed from the distal edge between opposing pairs of side shoulders 42, 44. The latch 40 includes a projecting lip 46 which commences an inwardly tapered cam surface 48. A recess 49 would be formed in the opposing side of the boss 38 due to molding techniques.

Forwardly projecting from the first housing member 24 is a wedge 50. The wedge includes an upper sloped surface 52 which downwardly slopes to meet a bottom flat surface 54. The first housing member 24 and the second housing member 26 are integrally connected by means of a hinge 56. The entire composite housing forming the telephone security clamp can actually be molded out of plastic and formed of a single unitary structure.

Figure 2:
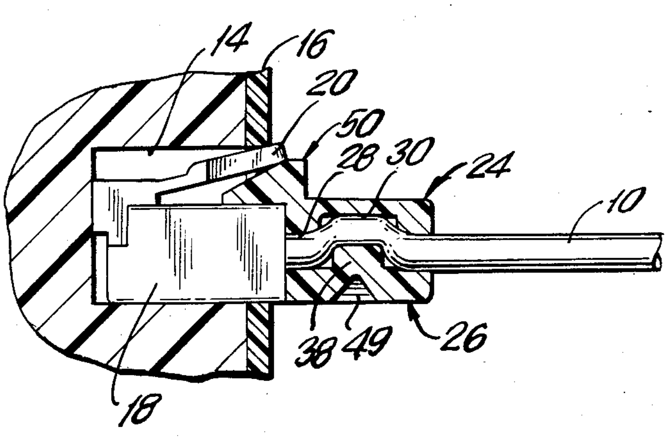
FIG. 2 is a cross sectional view taken through the assembly and showing the engagement of the telephone security clamp for operatively preventing removal of the modular jack from the modular socket.
Figure 3:
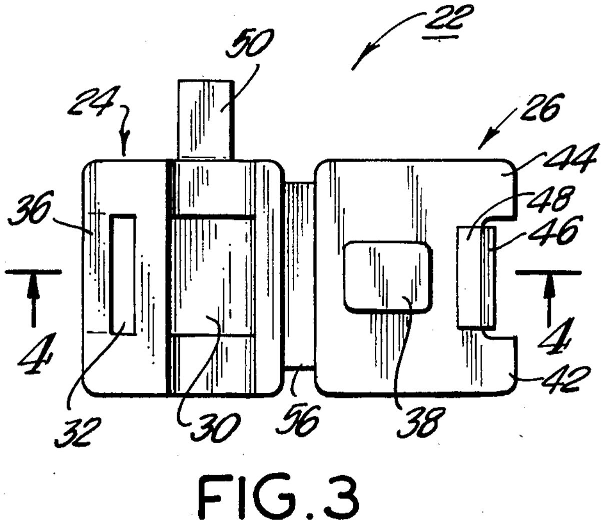
FIG. 3 is a top view of the telephone security clamp in its opened position.
Figure 6:
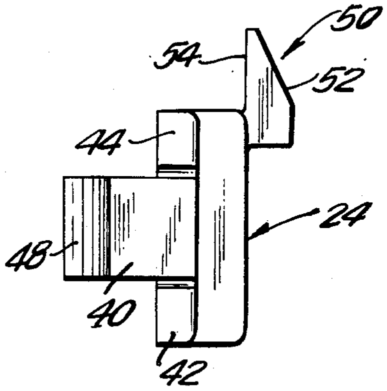
FIG. 6 is a side view of the opened clamp shown in FIG. 3.
Figure 4:
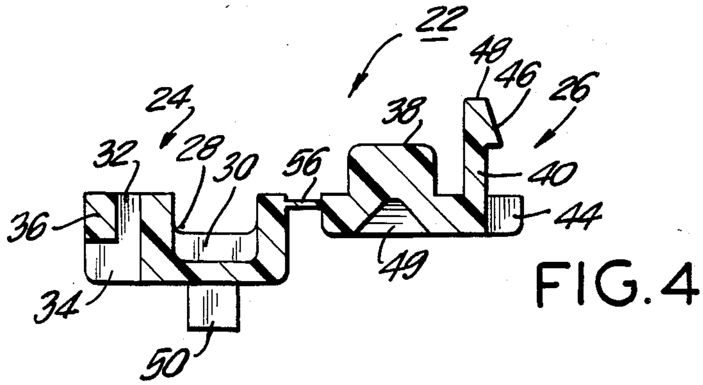
FIG. 4 is a cross sectional view taken along line 4—4 of FIG. 3.
Figure 5:
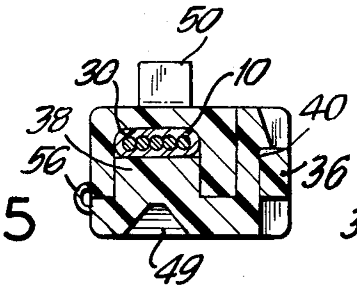
FIG. 5 is a cross sectional view through the center of the telephone security of clamp of FIG. 3 and showing the clamp in its closed position on a telephone wire.

In operation, as can best be seen in FIGS. 2 and 5, the device is placed adjacent to the standard modular jack with the modular jack inserted in its socket. The wedge portion 50 is wedged beneath the tang 20. The adjacent wire 10 is then inserted through the channel 28 in the first housing member 24. The second housing member 26 is then closed onto the first housing member 24. In so doing, the boss 38 depresses the wire into the recess 30 serving to lock the wire in place. The latch 40 extends into the receiving passageway 32 with the lip 46 engaging beneath the shoulder 36 to lock the second housing member 26 onto the first housing member 24.

The latch 40 is of the one time closure type whereby once it is closed it cannot be readily opened. An extremely tight fit is provided so that the lip 46 is directly beneath the shoulder 36 and cannot be disengaged. The only way to open the housing would be to slit the hinge 56 so as to completely separate the two members of the housing and thereby release the wire 10 from its being clamped in the housing by means of the strain relief mechanism between the boss 38 and the recess 30.

It should be appreciated, that since the wedge is integrally connected with the clamp itself, with the wedge inserted beneath the tang, the clamp locks onto the wire directly adjacent to the wedge. In this manner, the clamp serves to hold the wedge in place and prevents access to the wedge. As a result, the wedge cannot be removed from its position beneath the tang. So long as the clamp is in place, the tang of the modular jack is prevented from being released, thereby preventing removal of the modular jack from the modular socket.

The present security clamp can therefore be placed on each and every wire wherever a telephone jack is provided while the jack is still retained in its socket. The security clamp can be maintained in place and an unauthorized individual will not readily be able to remove the jack. Removal would require considerable manipulation whereby the unauthorized individual would have to spend a significant amount of time in order to open the security clamp. This would retard any unauthorized individual from easily grabbing and removing any of the telephone equipment. At the same time, the equipment still remains electrically connected to the telephone circuitry and can continuously be used even though the security clamp is in place.

Figure 7:
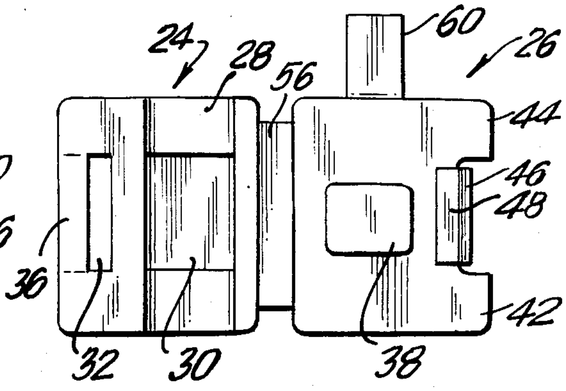
FIG. 7 is a top view of an alternate embodiment of the clamp in accordance with the present invention.

As shown in FIG. 7, the wedge 60 can be provided on the second housing member 26 rather than on the first housing member 24. The positioning of the wedge 60 on the second housing member might facilitate insertion of the wedge in particular circumstances. The wedge would again be inserted in place and the wire held in place. The members 24 and 26 would then be closed onto each other whereby the boss 38 would lock the wire into the recess 30. The latch 44 will then be inserted into the passageway 32 and would be locked beneath the shoulder portion 36.

There has been disclosed heretofore the best embodiment of the invention presently contemplated. However, it is to be understood that various changes and modifications may be made thereto without departing from the spirit of the invention.

I claim:

1. A telephone security clamp for preventing easy removal of modular telephone equipment electrically connected by modular beneath the release tang of a modular jack thereby blocking its depression to prevent removal of the jack from its socket, and means for preventing extraction of the wedge means from bemeath the tang.

2. A telephone security clamp as in claim 1, wherein said means for preventing comprises clamping means for securely clamping the telephone wire directly adjacent to the modular jack.

3. A telephone security clamp as in claim 2, and further comprising housing means rigidly supporting said wedge means and said clamp means as a unitary member.

4. A telephone security clamp as in claim 2, and further comprising latch means for retaining the clamping means secured onto the telephone wire.

5. A telephone security clamp as in claim 4, wherein said latch means is a one time closure device which can be easily closed and once closed cannot be readily opened.

6. A telephone security clamp as in claim 3, wherein said housing means comprise a first housing member, a second housing member, hinge means for closure of said second housing member onto said first housing member, latch means for securely locking said second housing member onto said first housing member, a channel formed through said first housing member for receiving therein the section of telephone wire extending from the telephone jack, and gripping means on said second housing member grippingly retaining the section of telephone wire in said channel as the second housing member is closed onto the first housing member.

7. A telephone security clamp as in claim 6, and including a strain relief lock for retaining the section of telephone wire in the channel, including a recess formed into the bottom of the channel, and a corresponding projection on the second housing member for engagement with the recess to thereby retain the section of telephone wire depressed into the recess to prevent sliding movement between the housing means and the telephone wire.

8. A telephone security clamp as in claim 6, wherein said wedge projects from said first housing member in a direction parallel to the channel.

9. A telephone security clamp as in claim 6, wherein said latch means comprise an elongated slot on said first housing member including an undercut shoulder, a locking tab projecting from said second housing member to matingly fit into said slot, and a lip on said locking tab for secure engagement under said shoulder to maintain the latch means in a closed position.

10. A telephone security clamp as in claim 1, wherein said wedge means includes a flat lower surface and an angled upper surface.

11. A method of preventing unauthorized removal of modular telephone equipment, which equipment is connected by modular jacks to modular sockets, the method comprising:

(a) insertion of a wedge beneath a release tang of the modular jack blocking its depression to thereby prevent removal of the jack from its socket, and (b) retaining the wedge in place beneath the tang.

12. A method as in claim 11, wherein said retaining step includes clamping the telephone wire directly adjacent to the jack with a clamp.

* * * * *